(12) United States Patent
Harder et al.

(10) Patent No.: US 11,549,548 B2
(45) Date of Patent: Jan. 10, 2023

(54) STOP WASHER FOR AN ELASTOMERIC BEARING, ELASTOMERIC BEARING AND SUBFRAME FOR A VEHICLE

(71) Applicant: VOLKSWAGEN AKTIENGESELLSCHAFT, Wolfsburg (DE)

(72) Inventors: Bettina Harder, Hannover (DE); Heino Meinen, Clausthal-Zellerfeld (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 445 days.

(21) Appl. No.: 16/793,415

(22) Filed: Feb. 18, 2020

(65) Prior Publication Data
US 2020/0263726 A1   Aug. 20, 2020

(30) Foreign Application Priority Data
Feb. 18, 2019   (DE) .............................. 102019202119

(51) Int. Cl.
*F16B 43/00* (2006.01)
*F16B 37/02* (2006.01)
*F16B 17/00* (2006.01)

(52) U.S. Cl.
CPC .............. *F16B 43/00* (2013.01); *F16B 37/02* (2013.01); *F16B 17/004* (2013.01)

(58) Field of Classification Search
CPC ...... F16B 17/004; F16B 33/00; F16B 33/002; F16B 37/02; F16B 37/04; F16B 37/041; F16B 39/00; F16B 39/10; F16B 39/24; F16B 43/00; Y10S 411/97

USPC ....................... 411/8, 13, 166, 167, 531, 533
See application file for complete search history.

(56) References Cited

U.S. PATENT DOCUMENTS

| | | | |
|---|---|---|---|
| 5,139,379 A * | 8/1992 | Hasan ..................... | F16B 39/28 411/371.1 |
| 5,445,477 A * | 8/1995 | Calandra, Jr. ........ | E21D 21/0086 411/545 |
| 5,516,176 A | 5/1996 | Kimoto et al. | |
| 5,934,855 A * | 8/1999 | Osterle ................... | E04D 5/142 411/545 |
| 6,270,302 B1 * | 8/2001 | Lyons ................... | F16B 31/028 411/DIG. 2 |
| 6,282,857 B1 * | 9/2001 | Rubenacker ............ | E04D 5/145 411/537 |
| 6,497,543 B1 * | 12/2002 | Lyons ................ | B23K 35/0288 411/545 |

(Continued)

FOREIGN PATENT DOCUMENTS

| | | |
|---|---|---|
| CN | 109306806 A | 2/2019 |
| DE | 102005042779 A1 | 5/2006 |

(Continued)

*Primary Examiner* — Roberta S Delisle
(74) *Attorney, Agent, or Firm* — Laurence A. Greenberg; Werner H. Stemer; Ralph E. Locher

(57) ABSTRACT

A stop washer for an elastomeric bearing is manufactured as a single unit from a sheet metal blank and furnished with a surface protection. In addition to its function as a path limiter, it has at least one of the following functions by a structure integrated into the forming process of the sheet metal blank, namely the function of a thread and/or anti-rotation protection. Furthermore, an elastomeric bearing with such a stop washer and a subframe equipped therewith are conceivable.

9 Claims, 3 Drawing Sheets

(56) References Cited

U.S. PATENT DOCUMENTS

| | | | |
|---|---|---|---|
| 6,561,124 B1 * | 5/2003 | Marczynski | F16B 1/0071 |
| | | | 116/306 |
| 7,429,053 B2 | 9/2008 | Katagiri et al. | |
| 10,207,565 B2 | 2/2019 | Preis et al. | |
| 2002/0102148 A1 * | 8/2002 | Shibata | F16B 15/00 |
| | | | 411/439 |
| 2003/0033783 A1 * | 2/2003 | Kobetsky | E04D 5/14 |
| | | | 52/410 |
| 2003/0228202 A1 * | 12/2003 | McGuire | F16B 37/00 |
| | | | 411/119 |
| 2005/0012279 A1 | 1/2005 | Hodges | |
| 2006/0049603 A1 | 3/2006 | Katagiri et al. | |
| 2012/0301249 A1 * | 11/2012 | Jablonski | F16B 1/0071 |
| | | | 411/394 |
| 2015/0147135 A1 * | 5/2015 | Koch | F16B 37/048 |
| | | | 411/353 |

FOREIGN PATENT DOCUMENTS

| | | |
|---|---|---|
| DE | 102015012869 A1 | 4/2017 |
| EP | 3314143 A1 | 5/2018 |
| JP | H05771478 U | 9/1993 |
| JP | 2009074573 A | 4/2009 |
| KR | 20040027062 A | 4/2004 |
| KR | 20070014551 A | 2/2007 |

\* cited by examiner

STOP WASHER FOR AN ELASTOMERIC BEARING, ELASTOMERIC BEARING AND SUBFRAME FOR A VEHICLE

CROSS-REFERENCE TO RELATED APPLICATION

This application claims the priority, under 35 U.S.C. § 119, of German application DE 10 2019 202 119, filed Feb. 18, 2019; the prior application is herewith incorporated by reference in its entirety.

BACKGROUND OF THE INVENTION

Field of the Invention

The invention relates to a stop washer for an elastomeric bearing.

An elastomeric bearing with a stop washer for supporting a subframe against a body of a motor vehicle is known, for example, from published, non-prosecuted German patent application DE 10 2005 042 779 A1, corresponding to U.S. Pat. No. 7,429,053.

It is often necessary to fasten cables and linings to chassis components or the vehicle body. For this purpose, fastening devices are usually furnished on the chassis components or vehicle body, to which the cables or linings are affixed, for example screwed or glued. Fastening devices may, for example, take the form of openings made in the chassis components or bodywork or of brackets, bolts and the like welded to the chassis components or bodywork.

However, especially in the region of the chassis of a motor vehicle, access for attaching an additional mounting bracket is often greatly limited. Installing such a bracket therefore sometimes poses challenges from the assembly standpoint.

In addition, welded-on holders, bolts and the like tend to corrode in the region of their attachment point unless costly countermeasures are taken. An original surface protection is usually damaged by the welding process, which makes additional measures necessary to restore it after application. The same applies to subsequently inserting openings or cutting threads. Here, too, the postprocessing impairs the initially applied surface protection. In addition, the relevant component may in some cases be weakened.

SUMMARY OF THE INVENTION

The object of the invention is to furnish a remedy for this situation. In particular, the invention has the object of simplifying, from the standpoint of fabrication and assembly, the provision of vehicle-side fastening devices for affixing add-on parts such as cables and linings in the region of the chassis.

This object is accomplished by a functionally integrated stop washer according to the independent stop washer claim. The stop washer for an elastomeric bearing according to the invention is manufactured in one piece from a sheet metal blank by forming; is furnished with a surface protection; and, in addition to its function as a path limiter, has at least one of the following functions as a result of a structure that is integrated into the sheet metal blank during forming of the sheet metal blank:
a) Thread, and
b) Anti-rotation protection.

The integration of the vehicle-side fastening device into the stop washer of an elastomeric bearing eliminates the above-described installation challenges that pertain to creating a vehicle-side attachment point. Instead, the device is integrated into a component, namely an elastomeric bearing, that may first be pre-assembled outside the chassis.

The attachment point is created simultaneously with the forming of the stop washer, so that the surface protection applied after the forming of the stop washer from a sheet metal blank is not damaged. As a result, subsequent measures to restore the same, such as are required in the above-described situations, may be omitted.

In comparison to the prior art, creating an attachment point simplifies fabrication, because no reworking is required and the shape required for the functional structure may be created at the outset when originally forming the stop washer. In addition, there is no need for the sometimes difficult assembly step of attaching the attachment point under spatial constraints in the chassis region.

The concept according to the invention, for integrating an attachment point for an add-on part such as a cable or lining, may likewise be applied to other structures that are created later on in order to provide additional functions.

For example, a structure to provide anti-rotation protection may likewise be included in the forming of the sheet metal blank, which completely eliminates the need for additional fabrication and assembly steps.

Advantageous configurations of the invention are the subject matter of additional patent claims.

In one variant embodiment, the thread is integrated into the sheet metal blank as a nut thread. For this purpose, a corresponding sleeve-like depression or recess may be formed on the blank. Ideally, structures for providing a thread, in particular a thread helix, are generated by the forming technique, so that no damage to the surface protection occurs.

However, it is also possible to subsequently cut a thread helix into the sleeve-like depression or recess or, for example, to use self-tapping bolts.

In another variant embodiment, the thread is analogously integrated into the sheet metal blank as a bolt thread. For this purpose, a corresponding projection may be formed thereon, and this projection may be furnished in advance with structures for providing a thread helix.

Here again, it is possible to subsequently cut a thread helix on the projection.

The anti-rotation protection may be formed in a very simple manner, for example, as a notch, projection or exposed tab on the sheet metal blank. Ideally, the anti-rotation protection is directly involved in the process of forming the sheet metal blank, so that the corresponding structures may be covered by the original surface protection.

In one variant embodiment, the surface protection is in the form of a protective layer applied after the process of forming the sheet metal blank, including the integrated structures.

The integration of functions may extend not only to a path limiter, a thread and an anti-rotation protection, but also to other functions that are also protected by the original surface protection. One variant embodiment provides the stop washer has at least one of the following additional functions, as a result of a structure integrated into the sheet metal blank during the forming process:
a) Positioning and/or alignment mark, and
b) Data carrier in the form of a two-dimensional code.

This may facilitate a manual or automated assembly. The two-dimensional code may be provided, for example, as a barcode or data matrix code. For this purpose, corresponding stampings or notches are applied to the sheet metal blank when forming the sheet metal blank, just as for positioning and alignment marks.

The above-mentioned object is additionally accomplished by means of an elastomeric bearing for a motor vehicle chassis according to the independent bearing claim, characterized in that at least one stop washer of the above-described kind is furnished on the elastomeric bearing as a mechanical path limiter. The integrated additional functions may be integrated into the stop washer individually or in any combination, as required, whether in order to provide cable routing, secure the elastomeric bearing against rotation at the installation location and/or place it correctly in its position and/or identify it.

In another advantageous variant embodiment, the elastomeric bearing equipped with the functionally integrated stop washer serves as a bearing on a subframe inside a motor vehicle chassis.

Other features which are considered as characteristic for the invention are set forth in the appended claims.

Although the invention is illustrated and described herein as embodied in a stop washer for an elastomeric bearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
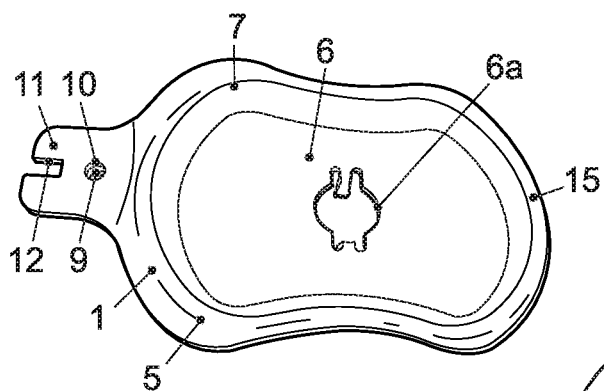
FIG. 1 is a diagrammatic, top plan view of one possible exemplary embodiment of a stop washer according to the invention.
Figure 2:
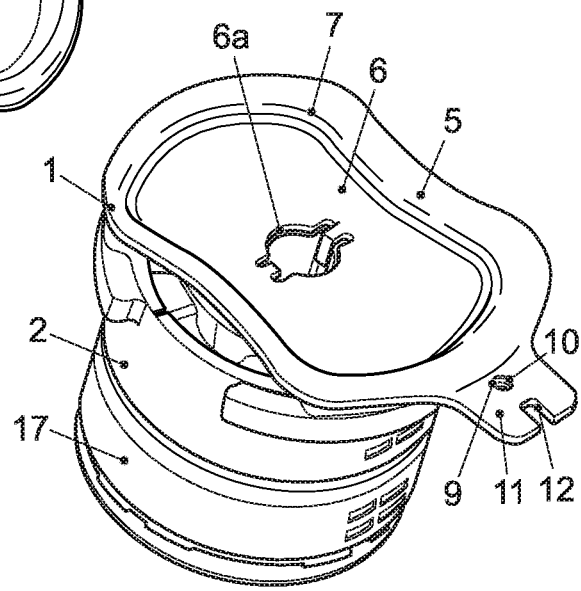
FIG. 2 is a perspective view of one possible exemplary embodiment of an elastomeric bearing with the stop washer according to the invention.
Figure 3:
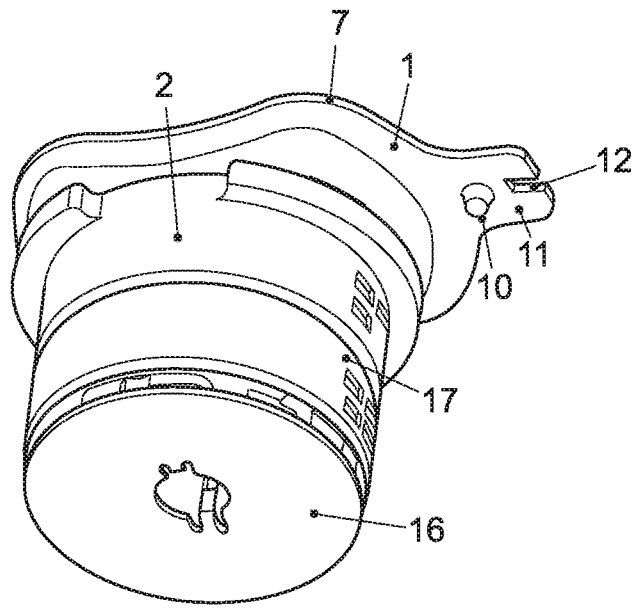
FIG. 3 another perspective view of the elastomeric bearing shown in FIG. 2.
Figure 4:
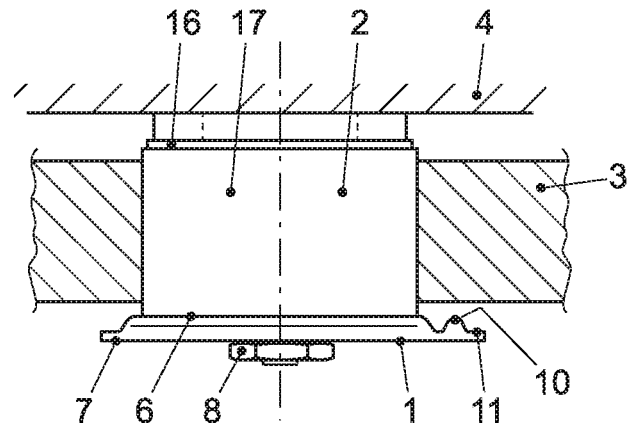
FIG. 4 is a sectional view of the elastomeric bearing as shown in FIG. 2, after being installed on a subframe of a motor vehicle chassis.

Referring now to the figures of the drawings in detail and first, particularly to FIG. 1 thereof, there is shown a stop washer 1 for an elastomeric bearing 2 shown in greater detail in FIGS. 2 to 4.

Figure 5:
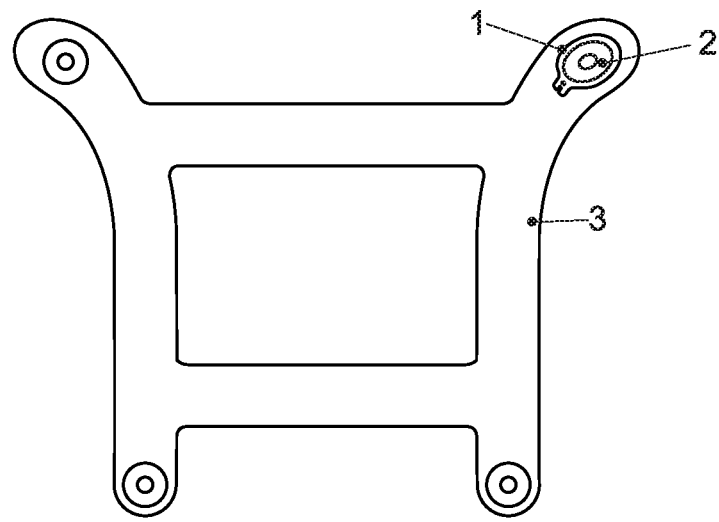
FIG. 5 is a schematic illustration of the subframe.

By means of the elastomeric bearing 2, which may be configured as a rubber-metal bearing as in published, non-prosecuted German patent application DE 10 2005 042 779 A1, for example, a subframe 3 shown schematically in FIG. 5 may be supported against a vehicle body 4 as shown in FIG. 4. The elastomeric bearing 2 may, for example, be pressed or otherwise secured to the subframe 3 with an opening.

In addition, a corresponding elastomeric bearing 2 may be used to support, for example, a control arm against the subframe 3 or directly against the vehicle body 4.

The stop washer 1 of the elastomeric bearing 2 is arranged on an axial end section of the bearing and, in the installation variant shown in FIG. 4, serves as a path limiter for the vertical movement of the subframe 3 relative to the vehicle body 4.

The stop washer 1 is manufactured from a sheet metal blank 5 as a single unit, for example by a sheet metal stamping technique.

In the exemplary embodiment shown, the stop washer 1 is tub-shaped. Accordingly, it has a tub base 6, which is surrounded by a rim 7 having a flange-like design. The tub base 6 serves as a support surface for a fastening means 8, by means of which the elastomeric bearing 2 is secured to the vehicle body 4, for example screwed on. For this purpose, a passage opening 6a is formed in the tub base 6.

In addition to its function as a path limiter, the stop washer 1 has at least one additional function that is provided by a structure integrated into the sheet metal blank 5 during the process of forming the metal blank 5. This additional function may be, for example, the function of a thread or an anti-rotation protection. In the exemplary embodiment shown, for purposes of illustration, both functions are integrated simultaneously into the sheet metal blank 5 of the stop washer 1.

For example, a bracket for a cable or a lining part may be screwed on by means of the thread.

In the present case, the function of a thread consists in a nut thread 9 integrated into the sheet metal blank 5, in particular its flange-like edge 7. For this purpose, a sleeve-like stamped-out portion 10 is furnished on the edge 7, on which structures manufactured by a forming technique may be provided that perform the function of a thread helix. It is also possible to cut corresponding thread helixes into the sleeve-like stamped-out portion 10 before applying a surface protection.

Alternatively, it is possible to screw a self-tapping bolt into the stamped-out portion 10. However, a self-tapping bolt would damage a surface protection on the stop washer 1, which is explained in greater detail below, and additional measures would be necessary in order to restore the surface protection.

In a modification of the exemplary embodiment shown in the drawings, the function of the thread may also be realized via a bolt thread integrated into the sheet metal blank 5. For this purpose, a corresponding projection is stamped onto the sheet metal blank 5, which may be furnished with a structure representing a thread helix, analogous to the nut thread 9.

In the exemplary embodiment shown, the thread is arranged on the flange-like edge 7 of the stop washer 1. However, such a thread may be furnished on the tub base 6 if necessary.

The stop washer 1 of the exemplary embodiment additionally has an anti-rotation protection integrated into the sheet metal blank 5, by means of which, for example, a bracket that has been screwed into the thread may be secured against rotation. The anti-rotation protection may, however, also involve other attached parts that are not individually fastened to the stop washer 1. In addition, a screwed-in bracket or other component itself may serve as an anti-rotation protection for another component, which is then not covered by the originally applied surface protection.

In the exemplary embodiment shown, the integrated anti-rotation protection is formed on a projection 11 that extends substantially parallel to the main extension plane of the stop washer 1, radially outward from the flange-like edge 7 thereof. The projection 11 is additionally furnished with a notch 12 that is configured as an abutment for a component that will be secured against rotation.

In a modification of the exemplary embodiment shown, it is also possible to design an anti-rotation protection as a notch 12 directly on the flange-like edge 7.

It is also possible to provide a notch 12 at the base of the tub 6.

In another variant embodiment, the anti-rotation protection may be obtained by bending a section of the flange-like frame 7 and/or the projection 11 relative to the main plane of extension of the stop washer 1 in order to obtain an exposed tab that, like all the above-mentioned anti-rotation protection variants, is formed integrally with the sheet metal blank 5 and is also stamped out during the forming thereof.

Figure 6:
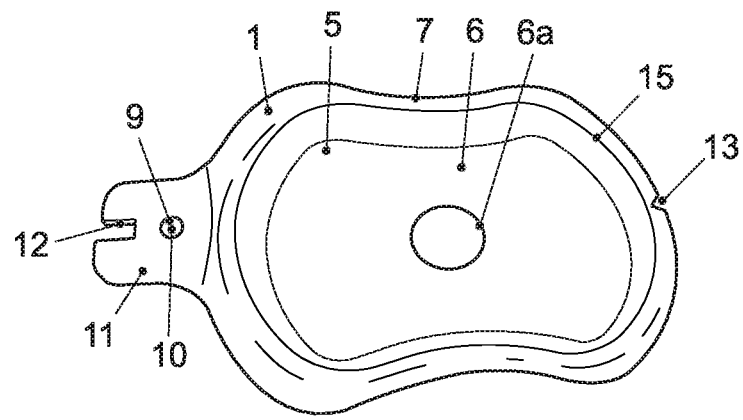
FIG. 6 is a plan view of a positioning and alignment mark.
Figure 7:
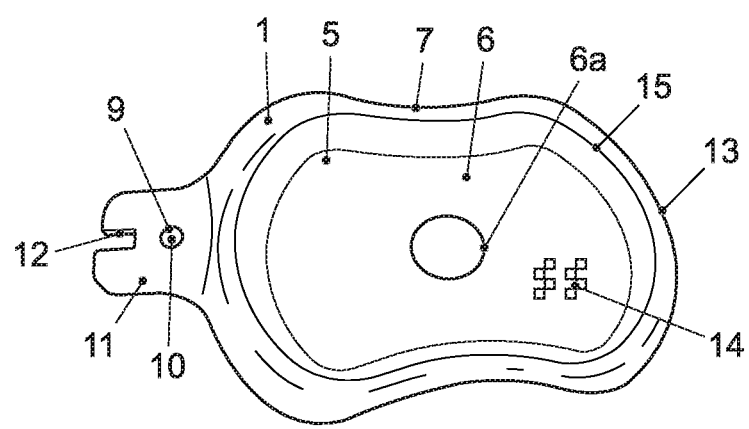
FIG. 7 is a plan view of a stamped two-dimensional code.

Furthermore, it is possible to realize the functions of a positioning and/or alignment mark 13 and/or a two-dimensional code 14, for example a bar code or a data matrix code, by means of a structure integrated during the forming process of the sheet metal blank 5, as shown by way of example in FIGS. 6 and 7. For this purpose, the sheet metal blank 5 may be furnished for example with corresponding stampings and/or notches, for example.

After completion of the forming process and before installation on the elastomeric bearing 2, the sheet metal blank 5 is coated with a surface protection 15. This surface protection 15 thus covers all the above-mentioned structures for additional functions integrated in the stop washer 1.

The one-piece embodiment of the stop washer 1 with integrated additional functions may be illustrated in a linked fabrication process that does not require additional joining processes or separate individual parts. This results in a minimal manufacturing effort for providing the additional functions mentioned above. The surface protection 15 is not affected by this, as the surface protection 15 is applied in the form of a protective layer only at the end of the forming process.

This enables simple and low-waste production, for example by means of sheet metal stamping technology, which does not require any other fabrication processes or individual parts. The thread as well as the anti-rotation protection may be positioned almost anywhere on the stop washer 1, which makes it easy to adapt the required connection and/or support point for an attachment part.

Because this connection and/or support point is furnished on the stop washer 1 and not on the vehicle body or a subframe, the assembly work required when fastening there may be dispensed with. This is particularly advantageous in the case of spatial constraints on a motor vehicle chassis. Instead, the attachment point, or in the case of an anti-rotation protection, the corresponding support point, is already applied when assembling the elastomeric bearing 2, and is then automatically present on the vehicle as a result of installing the elastomeric bearing 2 on the vehicle. This results in a considerable simplification of vehicle assembly.

The elastomeric bearing 2 shown in greater detail in FIGS. 2 to 4 is of a purely exemplary character. On the body side, it has a stop washer 16 manufactured by forming, which serves solely as a path limiter without any additional functions. Axially opposite is arranged the stop washer 1 of the type explained above, equipped with integrated additional functions. As FIGS. 2 to 4 show, the flange-like rim 7, and the projection 11 equipped with thread and anti-rotation protection, extend radially beyond the actual rubber-metal bearing section 17 of the elastomeric bearing 2. FIG. 5 shows, by way of example, the installation of such an elastomeric bearing 2 on a subframe 3 of a motor vehicle; it should be emphasized that the subframe 3 shown here is purely an example and may also have another shape.

The invention has been explained in greater detail above with reference to an exemplary embodiment and further modifications. The exemplary embodiment and the modifications serve to prove the feasibility of the invention. Individual technical features that have been explained above in context the context of additional individual features, may also be implemented independently of these other features and in combination with other individual features, even if such a combination is not expressly described, as long as doing so is technically possible. Accordingly, the invention is expressly not limited to the exemplary embodiment specifically described; instead, it comprises all configurations defined by the Claims.

LIST OF REFERENCE SIGNS

1 Stop washer
2 Elastomeric bearing
3 Subframe
4 Vehicle body
5 Sheet metal blank
6 Tub base
7 Edge
8 Fastening means
9 Nut thread
10 Sleeve-shaped stamped-out portion
11 Advance
12 Notch
13 Positioning and/or alignment mark
14 Two-dimensional code
15 Surface protection
16 Stop washer
17 Rubber metal bearing section

The invention claimed is:

1. A stop washer for an elastomeric bearing, comprising:
a sheet metal blank having characteristics of a sheet metal blank being formed in one piece by a sheet metal blank forming process;
the stop washer being configured as a path limiter and having at least one of a following further features, as a result of a structure created on said sheet metal blank during said sheet metal blank forming process:
a thread; and
an anti-rotation protection structure; and
a surface protection disposed on said sheet metal blank, said surface protection being a protective layer applied after the forming process of said sheet metal blank, including on said structure created on said sheet metal blank during said sheet metal blank forming process.

2. The stop washer according to claim 1, wherein said thread is integrated into said sheet metal blank as a nut thread.

3. The stop washer according to claim 1, wherein said thread is integrated into said sheet metal blank as a bolt thread.

4. The stop washer according to claim 1, wherein said anti-rotation protection structure is configured as a notch on said sheet metal blank.

5. The stop washer according to claim 1, wherein said anti-rotation protection structure is configured as a projection on said sheet metal blank.

6. The stop washer according to claim 1, wherein said anti-rotation protection structure is formed as an exposed tab on said sheet metal blank.

7. The stop washer according to claim 1, wherein said stop washer has at least one of a following additional features as a result of a further structure integrated into said sheet metal blank during the forming process of said sheet metal blank:
   a positioning and/or alignment mark; and
   a data carrier in a form of a two-dimensional code.

8. An elastomeric bearing for a motor vehicle chassis, comprising:
   an elastomeric bearing body; and
   at least one stop washer furnished on said elastomeric bearing body as a mechanical path limiter, said at least one stop washer containing:
   a sheet metal blank having characteristics of a sheet metal blank being formed in one piece by a sheet metal blank forming process;
      said at least one stop washer being configured as the mechanical path limiter and having at least one of a following further features, as a result of a structure created on said sheet metal blank during said sheet metal blank forming process:
         a thread; and
      an anti-rotation protection structure; and
   a surface protection disposed on said sheet metal blank, said surface protection being a protective layer applied after the forming process of said sheet metal blank, including on said structure created on said sheet metal blank during said sheet metal blank forming process.

9. A subframe for a motor vehicle, comprising the elastomeric bearing according to claim 8.

* * * * *